US009337736B2

(12) United States Patent
Chung et al.

(10) Patent No.: US 9,337,736 B2
(45) Date of Patent: May 10, 2016

(54) CONTROLLER WITH POWER SAVING FOR POWER CONVERTERS AND METHOD FOR THE SAME

(71) Applicant: SYSTEM GENERAL CORPORATION, New Taipei (TW)

(72) Inventors: Chi-Chen Chung, Jhubei (TW); Wei-Hsuan Huang, Taoyuan (TW)

(73) Assignee: SYSTEM GENERAL CORPORATION, New Taipei (TW)

( * ) Notice: Subject to any disclaimer, the term of this patent is extended or adjusted under 35 U.S.C. 154(b) by 162 days.

(21) Appl. No.: 13/786,746

(22) Filed: Mar. 6, 2013

(65) Prior Publication Data

US 2013/0241509 A1 Sep. 19, 2013

Related U.S. Application Data

(60) Provisional application No. 61/612,428, filed on Mar. 19, 2012.

(51) Int. Cl.
| | |
|---|---|
| *H02M 3/335* | (2006.01) |
| *G05F 1/46* | (2006.01) |
| *H02M 1/08* | (2006.01) |
| *H02M 1/00* | (2006.01) |

(52) U.S. Cl.
CPC ............... *H02M 3/335* (2013.01); *G05F 1/46* (2013.01); *H02M 1/08* (2013.01); *H02M 3/33523* (2013.01); *H02M 2001/0006* (2013.01); *H02M 2001/0025* (2013.01); *H02M 2001/0032* (2013.01); *H02M 2001/0035* (2013.01); *Y02B 70/16* (2013.01)

(58) Field of Classification Search
CPC ............ G05F 1/46; H02M 1/08; H02M 3/335; H02M 1/42
USPC .......................... 323/222, 224, 225, 282–288; 363/21.08, 21.12, 21.13, 21.16, 49, 89, 363/97, 98, 132
See application file for complete search history.

(56) References Cited

U.S. PATENT DOCUMENTS

| | | | | |
|---|---|---|---|---|
| 5,773,966 | A * | 6/1998 | Steigerwald | 323/284 |
| 6,724,174 | B1 * | 4/2004 | Esteves et al. | 323/224 |
| 7,030,596 | B1 * | 4/2006 | Salerno et al. | 323/282 |
| 7,304,464 | B2 * | 12/2007 | Weng et al. | 323/285 |
| 7,498,788 | B2 * | 3/2009 | Yang | 323/283 |
| 7,940,035 | B2 * | 5/2011 | Yang | 323/297 |
| 7,999,527 | B2 * | 8/2011 | Yang et al. | 323/284 |
| 8,059,429 | B2 * | 11/2011 | Huynh | 363/18 |

(Continued)

*Primary Examiner* — Gary L Laxton
*Assistant Examiner* — Kyle J Moody
(74) *Attorney, Agent, or Firm* — McClure, Qualey & Rodack, LLP (57) ABSTRACT

A controller with power saving for a power converter includes a delay circuit, a detection circuit, an output circuit, a counter circuit, a wake-up circuit and a PWM circuit. The delay circuit determines a delay time. The detection circuit activates the delay circuit whenever an output load of the power converter is lower than a light-load threshold. The output circuit generates a power-saving signal to cease a regulation of the power converter after the delay time ends. The regulation of the power converter is resumed once the output load increases during the regulation of the power converter is being ceased. The counter circuit coupled to the delay circuit is counted by the delay circuit to determine a sleep period. The output circuit generates the power-saving signal to cease the regulation of the power converter after the sleep period ends.

8 Claims, 6 Drawing Sheets

(56) References Cited

U.S. PATENT DOCUMENTS

| | | | |
|---|---|---|---|
| 8,085,021 B2* | 12/2011 | Chen et al. | 323/282 |
| 8,164,932 B2* | 4/2012 | Sims et al. | 363/69 |
| 9,219,418 B2* | 12/2015 | Balakrishnan | H02M 3/335 |
| 9,263,955 B2* | 2/2016 | Schmid | H02M 3/33523 |
| 2009/0237053 A1* | 9/2009 | Gan | 323/283 |
| 2009/0309634 A1* | 12/2009 | Yang et al. | 327/109 |
| 2010/0156366 A1* | 6/2010 | Sakai et al. | 323/282 |
| 2011/0242858 A1* | 10/2011 | Strzalkowski | 363/21.13 |
| 2013/0235620 A1* | 9/2013 | Morris et al. | 363/21.12 |
| 2014/0036548 A1* | 2/2014 | Yang et al. | 363/21.07 |
| 2015/0311801 A1* | 10/2015 | Causse | H02M 3/158 323/282 |

\* cited by examiner

CONTROLLER WITH POWER SAVING FOR POWER CONVERTERS AND METHOD FOR THE SAME

CROSS REFERENCE TO RELATED APPLICATIONS

This application claims the benefit of U.S. Provisional Application No. 61/612,428, filed on Mar. 19, 2012, the contents of which are incorporated herein by reference.

BACKGROUND OF THE INVENTION

1. Field of the Invention

The present invention relates to a power converter, and more particularly, the present invention relates to a controller of the power converter.

2. Description of the Related Art

Mobile phones have become more and more important to human lives nowadays. However, most of their power converters, usually called chargers, are not removed from wall outlet by users after the charging is done. According to the statistics, up to two-thirds of the electricity consumed by a mobile device is lost under no-load condition. This could increase unnecessary greenhouse emissions and fossil fuel consumption.

Recently, the world's top-five mobile phone manufacturers have voluntarily signed a Charger Star Rating System Agreement. Chargers will be labeled starting at zero star rating for standby power consumption greater than 0.5 W and ending at five stars rating for standby power consumption lower than 0.03 W (30 mW) under no load condition.

BRIEF SUMMARY OF THE INVENTION

As a result, a smarter power converter complying with most stringent power saving standard is desired by the industries.

The present invention proposes a controller with power saving for a power converter. The controller comprises: a delay circuit, a detection circuit, an output circuit, a counter circuit, a wake-up circuit and a PWM (pulse width modulation) circuit. The delay circuit determines a delay time. The detection circuit activates the delay circuit whenever an output load of the power converter is lower than a light-load threshold. The output circuit generates a power-saving signal to cease a regulation of the power converter after the delay time ends. The regulation of the power converter is resumed once the output load increases during the regulation of the power converter is being ceased. The counter circuit coupled to the delay circuit is counted by the delay circuit to determine a sleep period. The output circuit generates the power-saving signal to cease the regulation of the power converter after the sleep period ends. The PWM circuit is coupled to the detection circuit to generate a switching signal for the regulation of the power converter. The output load is detected by detecting a feedback signal correlated to an output of the power converter. The detection circuit deactivates the power-saving signal whenever the feedback signal becomes higher than a recovery threshold. The detection circuit also deactivates the power-saving signal whenever a counting number of the switching pulses of the power converter exceeds a determined pulse count. An output voltage of the power converter and a supply voltage of the controller ramp down whenever the regulation of the power converter is ceased. The wake-up circuit is coupled to the PWM circuit and the detection circuit to avoid the supply voltage of the controller falling below a shut-down threshold.

The present invention also proposes a method of power saving for a power converter. The method comprises: enabling at least one first driving pulse group in a first time range which is generated by a controller in a burst manner to keep a supply voltage of the controller of the power converter around a regulated magnitude which is approximately constant; determining a mode period once a feedback signal of the controller is lower than a burst threshold; disabling the first driving pulse group whenever the mode period exceeds a sleep period; enabling at least one second driving pulse group in a second time range which is generated by the controller in the burst manner to pull back the supply voltage of the controller to the regulated magnitude whenever the supply voltage of the controller reaches a wake-up threshold, wherein in the second time range, the power converter is responsive to load changes; and enabling a third driving pulse group in a third time range in a continuous manner whenever an output current of the power converter is available.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to reduce standby input power consumption, green/burst mode was proposed in prior arts. However, standby (no load condition) entry/leaving criterion are more important for the optimization between standby power consumption and dynamic response. The present invention proposes an algorithm for standby entry/leaving criterion to achieve mW-class power consumption under standby mode.

Figure 1:
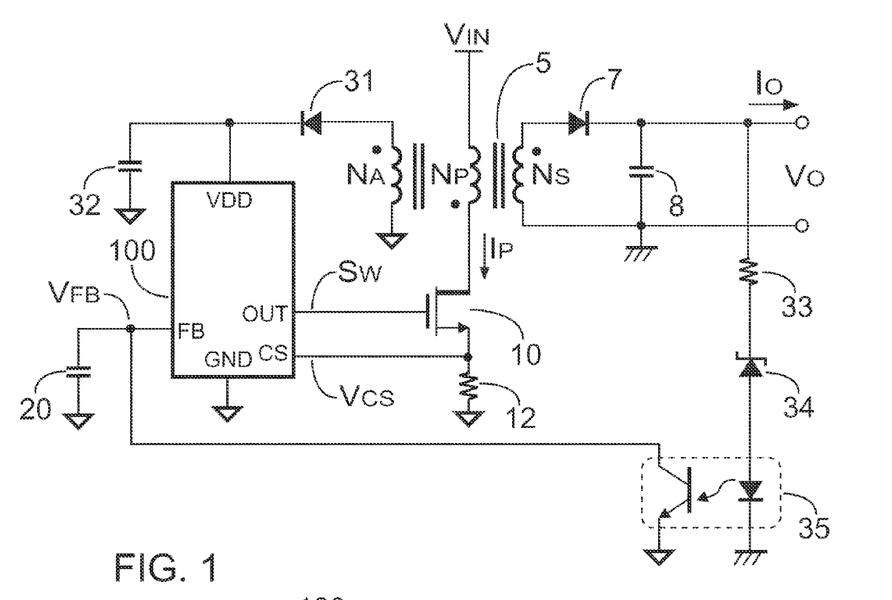
FIG. 1 shows a schematic of a power converter according to the present invention.

FIG. 1 shows a power converter having power saving apparatus. The power converter comprises a controller 100, a transformer 5, a power switch 10, a current-sense resistor 12, a primary rectifier 31, a supply capacitor 32, a secondary rectifier 7, an output capacitor 8 and a feedback circuit. The transformer 5 has a primary winding $N_P$, a secondary winding $N_S$ and an auxiliary winding $N_A$. The controller 100 comprises a supply terminal VDD, an output terminal OUT, a current-sense terminal CS, a feedback terminal FB and a ground terminal GND.

Figure 2:
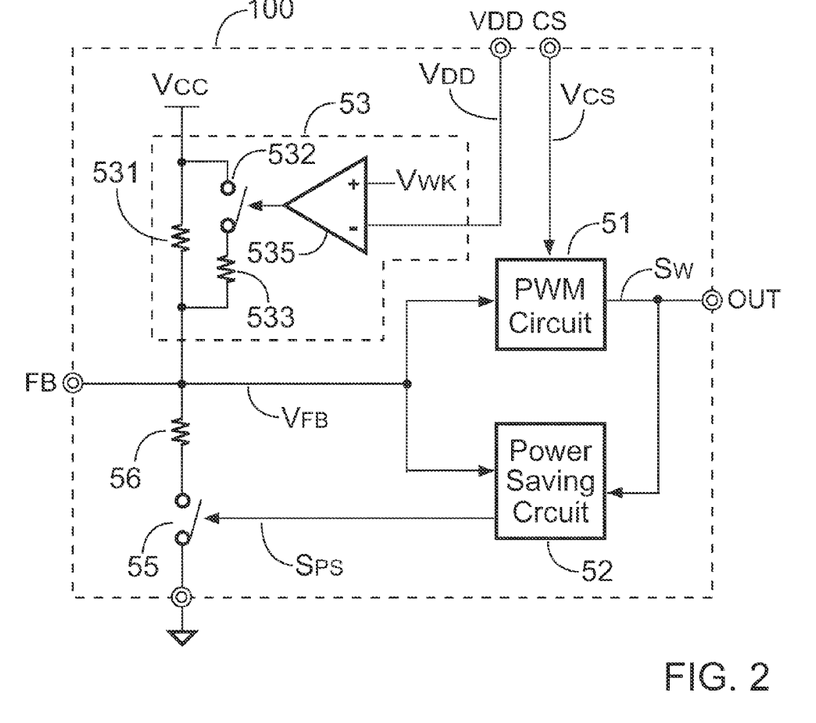
FIG. 2 shows an embodiment of the controller according to the present invention.

FIG. 2 shows an embodiment of the controller 100 of the power converter. The controller 100 comprises a PWM (pulse width modulation) circuit 51, a power saving circuit 52, a wake-up circuit 53, a resistance device 56 and a switch 55. Both referring to FIG. 1 and FIG. 2, the feedback circuit comprises a resistor 33, a zener diode 34, an opto-coupler 35, a capacitor 20 and the wake-up circuit 53. The resistor 33 and the zener diode 34 are connected in series between an output of the power converter and an input of the opto-coupler 35. An output of the opto-coupler 35 is connected to the feedback terminal FB of the controller 100. The capacitor 20 is connected between the feedback terminal FB of the controller 100 and the ground reference for frequency compensation. The wake-up circuit 53 pulls up a feedback signal $V_{FB}$ at the feedback terminal FB. The feedback signal $V_{FB}$ represents an output load of the power converter. The wake-up circuit 53 comprises a first resistor 531, a second resistor 533, a switch 532 and a comparator 535. A first terminal of the first resistor 531 receives a power voltage $V_{CC}$. A second terminal of the first resistor 531 is connected to the feedback terminal FB of the controller 100. The switch 532 and the second resistor 533 are connected in series between the first terminal and the second terminal of the first resistor 531. The switch 532 is controlled by an output of the comparator 535. A positive terminal of the comparator 535 is supplied with a wake-up threshold $V_{WK}$. A negative terminal of the comparator 535 is supplied with a supply voltage $V_{DD}$ at the supply terminal VDD of the controller 100. When the supply voltage $V_{DD}$ is greater than the wake-up threshold $V_{WK}$, the resistance of the wake-up circuit 53 will be equal to the resistance of the first resistor 531. When supply voltage $V_{DD}$ is lower than the wake-up threshold $V_{WK}$, the resistance of the wake-up circuit 53 will be equal to the paralleled resistance of the first resistor 531 and the second resistor 533. The wake-up circuit 53 essentially is a resistance modulation circuit controlled by the supply voltage $V_{DD}$. The wake-up circuit 53 is coupled to the PWM circuit 51 and the power saving circuit 52 to avoid the supply voltage $V_{DD}$ of the controller 100 falling below a UVLO (Under Voltage Lock Out) voltage $V_{UV}$, which is also a shut-down threshold for the controller 100. The PWM circuit 51 generates a switching signal $S_W$ for switching the transformer 5 and regulating an output voltage $V_O$ and an output current $I_O$ of the power converter in response to the feedback signal $V_{FB}$ and a current-sense signal $V_{CS}$. The operation of the PWM circuit 51 is well known to those skilled in the art and will be omitted hereinafter. The current-sense signal $V_{CS}$ is generated across the current-sense resistor 12 according to a switching current $I_P$.

The feedback circuit is coupled to the output voltage $V_O$ of the power converter to generate the feedback signal $V_{FB}$. The power saving circuit 52 is coupled to receive the feedback signal $V_{FB}$ and the switching signal $S_W$ for generating a power-saving signal $S_{PS}$. The switch 55 connected in series with the resistance device 56 is coupled to control the feedback signal $V_{FB}$ in response to the power-saving signal $S_{PS}$.

Figure 3:
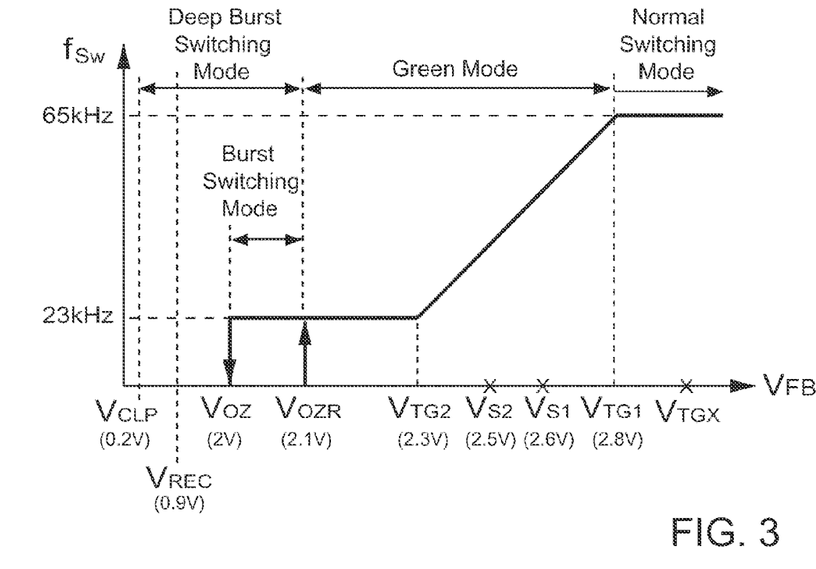
FIG. 3 shows a curve of a feedback signal and a switching frequency of a switching signal.

FIG. 3 shows a curve of the feedback signal $V_{FB}$ and a switching frequency $f_{Sw}$ of the switching signal $S_W$. When the power converter is operated in normal switching mode, the feedback signal $V_{FB}$ is greater than a first green threshold $V_{TG1}$ and the switching frequency $f_{Sw}$ of the switching signal $S_W$ is at a first frequency, for example, 65 kHz. Whenever the load decreases and the feedback signal $V_{FB}$ falls below the first green threshold $V_{TG1}$, the switching frequency $f_{Sw}$ of the switching signal $S_W$ will start to linearly decrease. The linear decrement of the switching frequency $f_{Sw}$ of the switching signal $S_W$ will end and be kept at a second frequency, for example, 23 kHz, whenever the feedback signal $V_{FB}$ falls below a second green threshold $V_{TG2}$. As the load goes lower, for example the feedback signal $V_{FB}$ falls below a first burst threshold $V_{OZ}$, the switching signal $S_W$ will be disabled. The switching signal $S_W$ will be enabled again when the feedback signal $V_{FB}$ becomes higher than a second burst threshold $V_{OZR}$. In one embodiment of the present invention, the magnitude of the thresholds $V_{OZ}$, $V_{OZR}$, $V_{TG2}$ and $V_{TG1}$ are respectively 2V, 2.1V, 2.3V and 2.8V.

Figure 4:
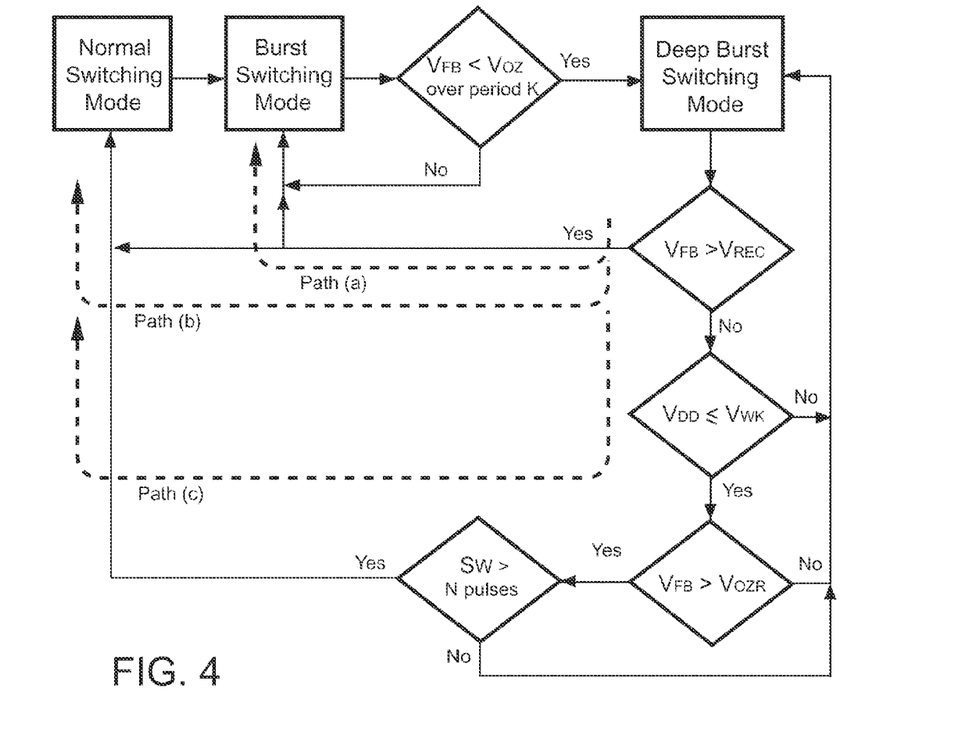
FIG. 4 shows a flowchart of a power saving algorithm according to the present invention.

FIG. 4 shows a flowchart of the power saving algorithm according to the present invention. The algorithm comprises three operation modes: normal switching mode, burst switching mode and deep burst switching mode. The linear frequency decreasing mode (green mode) will be omitted hereinafter for simplify the explanation. As load decreases to a relative light level, the power converter will enter the burst switching mode from the normal switching mode. As a determined mode period during which the feedback signal $V_{FB}$ falls below the first burst threshold $V_{OZ}$ sustains longer than a sleep period K, the power converter will enter the deep burst switching mode. Otherwise, the power converter will still operate in the burst switching mode. Once the feedback signal $V_{FB}$ continues to decrease and is lower than a recovery threshold $V_{REC}$, which is lower than the second burst threshold $V_{OZR}$, the power converter will operate in the deep burst switching mode. Whenever the feedback signal $V_{FB}$ becomes higher than the recovery threshold $V_{REC}$, the power converter will return to the burst switching mode or the normal switching mode in response to the load conditions. When the load condition is lighter, the power converter will return to the burst switching mode, as path (a) shows. When the load condition is heavier, the power converter will return to the normal switching mode, as path (b) shows. The power converter will stay in deep burst switching mode whenever the supply voltage $V_{DD}$ is still higher than the wake-up threshold $V_{WK}$. Once the feedback signal $V_{FB}$ is lower than the second burst threshold $V_{OZR}$, the power converter will stay in the deep burst switching mode. Otherwise, once the feedback signal $V_{FB}$ is higher than the second burst threshold $V_{OZR}$, the pulses of the switching signal $S_W$ will be counted. Once the pulse counts exceed a threshold N, the power converter will directly turn back to the normal switching mode, as path (c) shows. Otherwise, the power converter will stay at the deep burst switching mode.

Figure 5A:
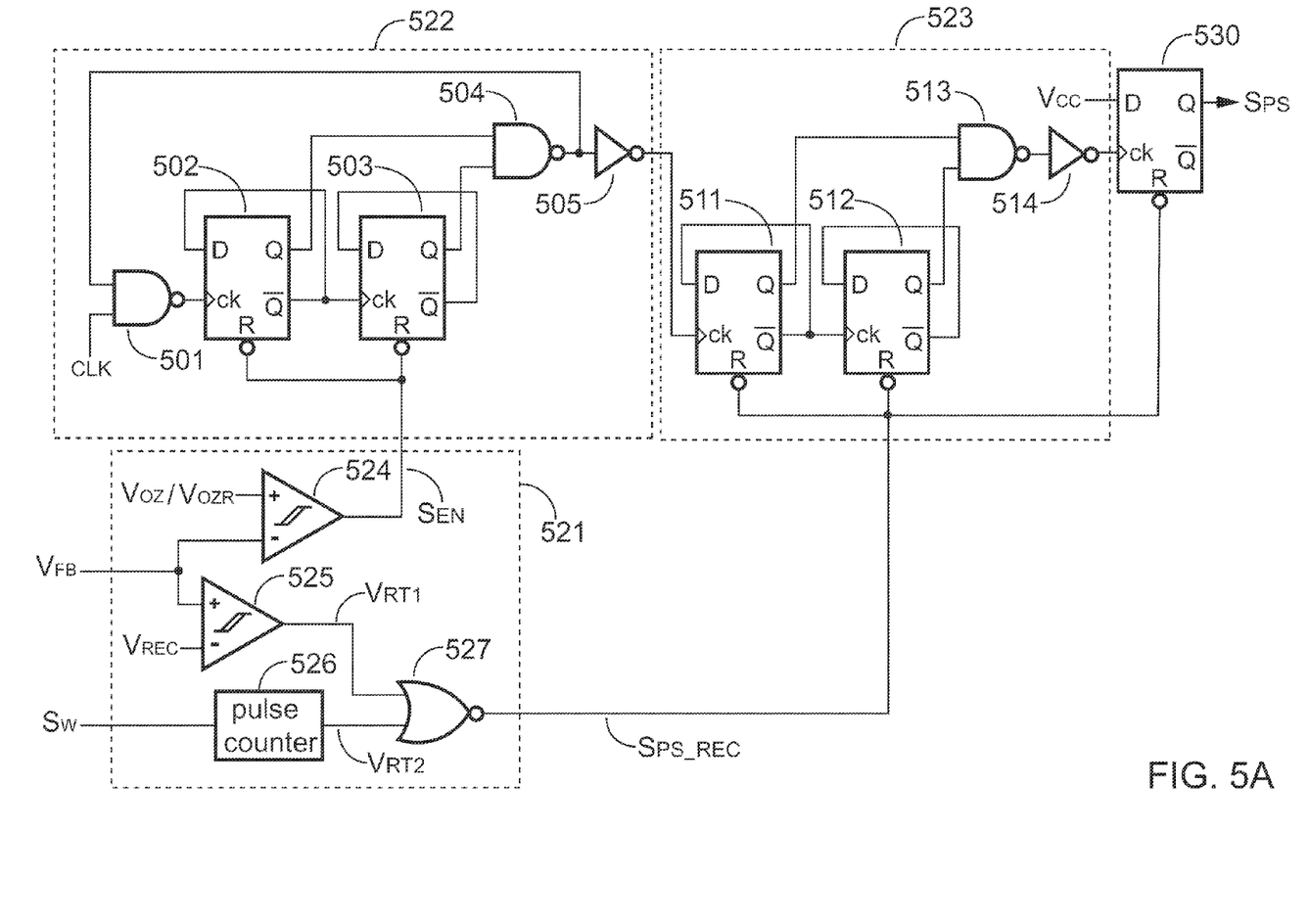
FIG. 5A shows an embodiment of a power saving circuit of the controller according to the present invention.

FIG. 5A shows an embodiment of the power saving circuit 52 of the controller 100. The power saving circuit 52 comprises a detection circuit 521, a timer circuit and an output circuit 530. The output circuit 530 is implemented by a flip-flop, in one embodiment of the present invention. The timer circuit comprises a delay circuit 522 and a counter circuit 523. The detection circuit 521 comprises comparators 524 and 525, a pulse counter 526 and a NOR gate 527. The delay circuit 522 comprises NAND gates 501 and 504, flip-flops 502 and 503 and an inverter 505. The counter circuit 523 comprises a NAND gate 513, flip-flops 511 and 512 and an inverter 514. The feedback signal $V_{FB}$ is supplied to a positive terminal of the comparator 525 and a negative terminal of the comparator 524. The comparator 524 has a hysteresis threshold $V_{OZ}/V_{OZR}$ (referred to as a light-load threshold) at its positive terminal. The comparator 525 has the recovery threshold $V_{REC}$ at its negative terminal Once the feedback signal $V_{FB}$ is lower than the first burst threshold $V_{OZ}$, an enabling signal $S_{EN}$ output by the comparator 524 will be enabled to activate the delay circuit 522. The delay circuit 522 and the counter circuit 523 determine the sleep period K as the enabling signal $S_{EN}$ is enabled. Once the mode period where the feedback signal $V_{FB}$ is lower than the threshold $V_{OZ}$ sustains longer than the sleep period K, the power-saving signal $S_{PS}$ will be enabled. Referring to FIG. 2, whenever the power-saving signal $S_{PS}$ is enabled, the switch 55 will be turned on and the feedback signal $V_{FB}$ will be pulled low to a clamped level $V_{CLP}$ shown in FIG. 6. Thanks to the detection circuit 521, the power converter can resume its operation by disabling the power-saving signal $S_{PS}$ when the power converter enters the deep burst switching mode. This dramatically improves the dynamic response performance of the power converter. The supply voltage $V_{DD}$ will begin to ramp down once the feedback signal $V_{FB}$ is clamped at the clamped level $V_{CLP}$ to cease the switching of the switching signal $S_W$. Before the supply voltage $V_{DD}$ is higher than the wake-up threshold $V_{WK}$ and in the meantime the feedback signal $V_{FB}$ is not higher than the recovery threshold $V_{REC}$, the power converter will stay its operation at the deep burst switching mode. The power converter will leave the deep burst switching mode to enter burst switching mode or normal switching mode in response to load conditions as path (a) and path (b) respectively show. Whenever the feedback signal $V_{FB}$ is higher than the recovery threshold $V_{REC}$, a first return signal $V_{RT1}$ will be generated at an output of the comparator 525. This first return signal $V_{RT1}$ will make the NOR gate 527 to generate a logic-low recovery signal $S_{PS\_REC}$ to disable the power-saving signal $S_{PS}$ via the output circuit 530. A second return signal $V_{RT2}$ generated by the pulse counter 526 will also make the NOR gate 527 to generate the logic-low recovery signal $S_{PS\_REC}$ whenever the counting number of the switching signal $S_W$ counted by the pulse counter 526 exceeds a determined pulse count (threshold) N when the power converter is operated in the deep bust switching mode. This logic-low recovery signal $S_{PS\_REC}$ will disable the power-saving signal $S_{PS}$. Therefore, the power converter will return to normal switching mode, as path (c) shows.

Figure 5B:
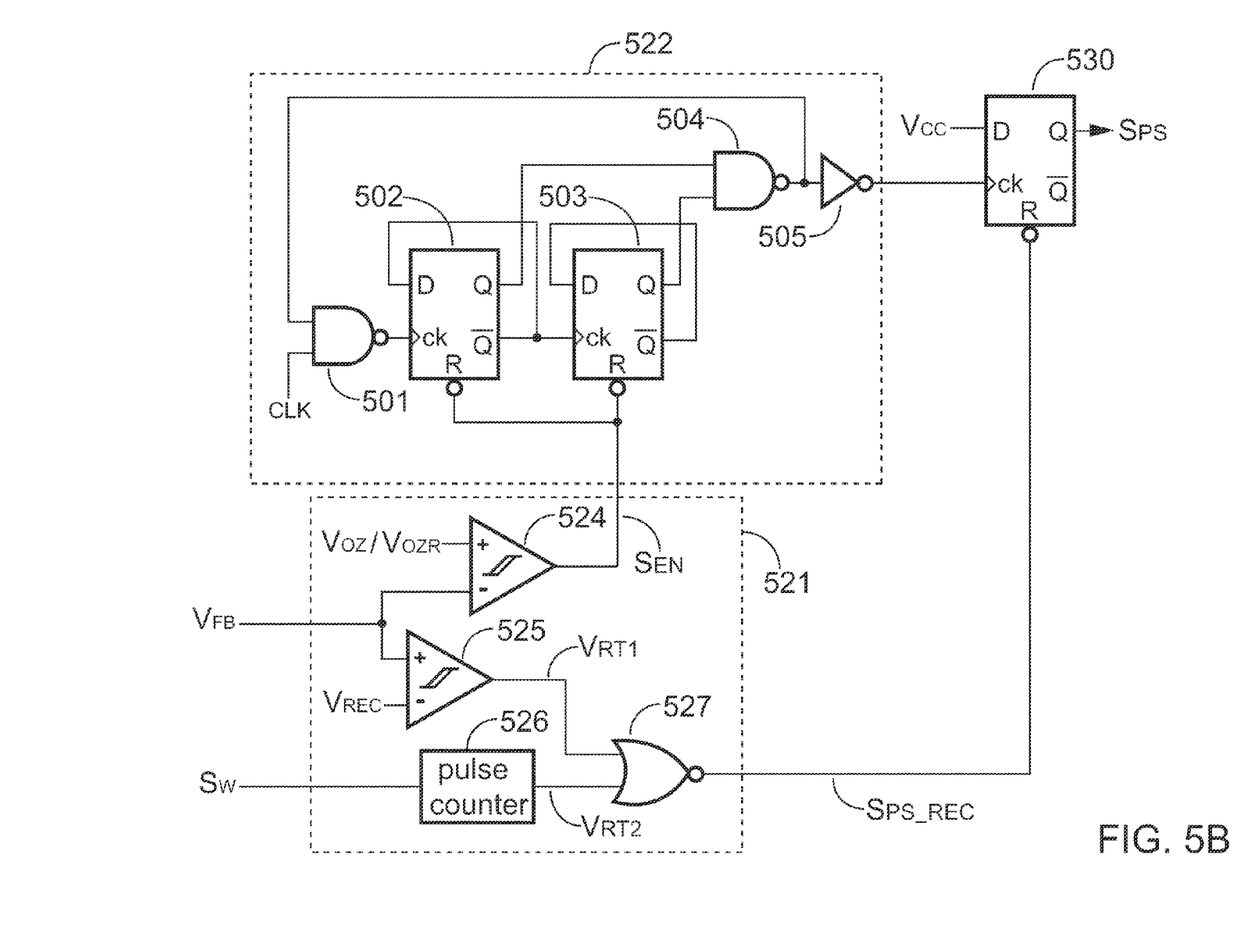
FIG. 5B shows another embodiment of the power saving circuit of the controller according to the present invention.

In an embodiment of the present invention, the counter circuit 523 will count for three times to enable the output of the counter circuit 523 which is also the output of the inverter 514, to enable the power-saving signal $S_{PS}$. FIG. 5B shows another embodiment of the power saving circuit 52 where the counter circuit 523 is unavailable. That is, once the feedback signal $V_{FB}$ falls below the first burst threshold $V_{OZ}$, the power-saving signal $S_{PS}$ will be enabled after the delay time determined by the delay circuit 522.

Figure 6:
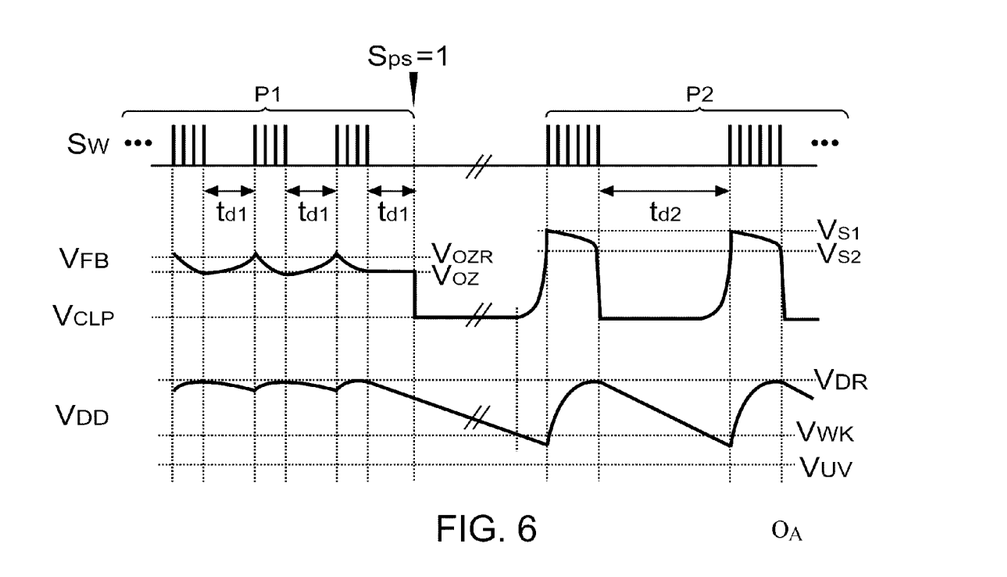
FIG. 6 shows waveforms of the switching signal, the feedback signal and a supply voltage of the controller when the power converter enters a deep burst switching mode from a burst switching mode.

FIG. 6 shows waveforms of the switching signal $S_W$, the feedback signal $V_{FB}$ and the supply voltage $V_{DD}$ of the controller 100 when the power converter enters the deep burst switching mode from the burst switching mode. The first time range P1 represents that the switching of the power switch 10 is operated in the burst switching mode and has a first dead time $t_{d1}$ between any two driving pulse groups. A second time range P2 represents that the switching of the power switch 10 is operated in the deep burst switching mode and has a second dead time $t_{d2}$ between any two driving pulse groups. In one embodiment of the present invention, the second dead time $t_{d2}$ is longer than the first dead time $t_{d1}$. In one embodiment of the present invention, whenever the mode period accumulated by the first dead time $t_{d1}$ being counted by three times exceeds the sleep period K, the power-saving signal $S_{PS}$ will be enabled to clamp the feedback signal $V_{FB}$. Once the feedback signal $V_{FB}$ is clamped, the regulation of the power converter will be ceased and the output voltage $V_O$ and the supply voltage $V_{DD}$ of the power converter will start to ramp down. The wake-up threshold $V_{WK}$ is set to be higher than the UVLO (Under Voltage Lock Out) voltage $V_{UV}$. When the supply voltage $V_{DD}$ reaches the wake-up threshold $V_{WK}$, the feedback signal $V_{FB}$ will be pulled up again. Since the capacitor 20 is connected at the feedback terminal FB of the controller 100, the pull-up response of the feedback signal $V_{FB}$ will not be instant. In another embodiment of the present invention, the capacitor 20 can be a parasitic capacitor at the feedback terminal FB of the controller 100. Before the feedback signal $V_{FB}$ is not pulled up to a start-threshold $V_{S1}$, the supply voltage $V_{DD}$ of the controller 100 will still ramp down to be lower than the wake-up threshold $V_{WK}$. When the feedback signal $V_{FB}$ reaches the start-threshold $V_{S1}$, the power switch 10 will be switched again in the deep burst switching mode operation. In the meantime, the supply voltage $V_{DD}$ will be charged toward its regulated value $V_{DR}$ and the feedback signal $V_{FB}$ will be declined. Once the supply voltage $V_{DD}$ reaches its regulated value $V_{DR}$ and the feedback signal $V_{FB}$ will reaches to a stop-threshold $V_{S2}$ at the same time, the switching of the power switch 10 will be ceased. The supply voltage $V_{DD}$ will again ramp down during the second dead time $t_{d2}$. In one embodiment of the present invention, the numbers of the switching pulses of the switching signals $S_W$ in the second time range P2 (deep burst switching mode) is more than that in the first time range P1 because the second dead time $t_{d2}$ is longer than the first dead time $t_{d1}$. A longer dead time, as shown in FIG. 6, will help to save more power consumption when the power converter is in very light load condition. Thanks to the detection circuit 521 in FIG. 5A and FIG. 5B, the power converter can resume its operation by disabling the power-saving signal $S_{PS}$ during the time ranges P1 and P2. This dramatically improves the dynamic response performance of the power converter.

Figure 7:
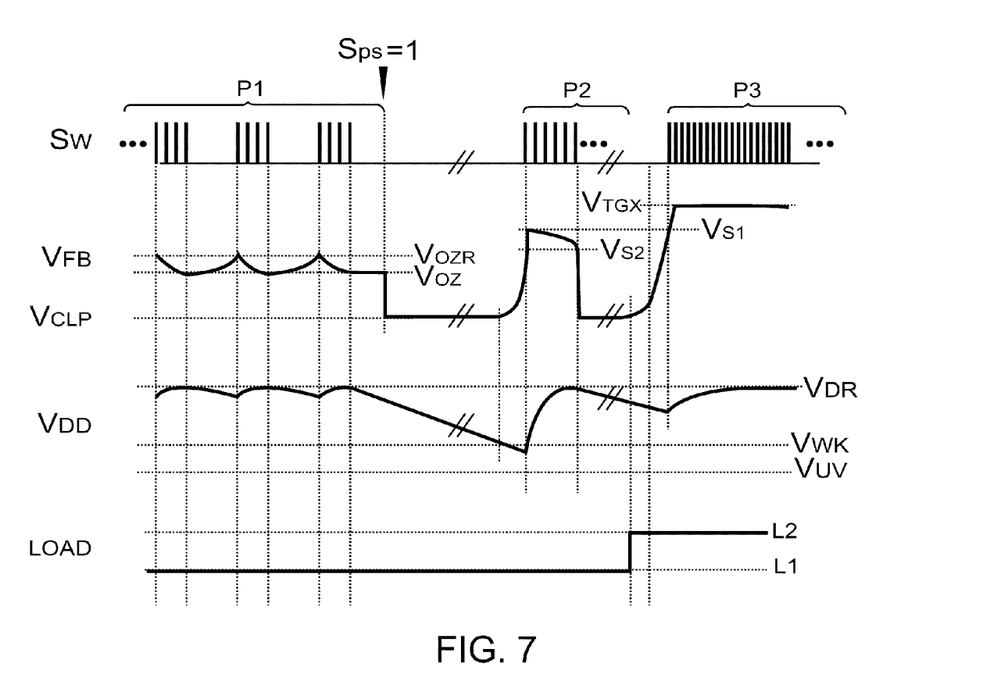
FIG. 7 shows waveforms of the switching signal, the feedback signal and the supply voltage of the controller when the power converter enters a normal switching mode from the deep burst switching mode.

FIG. 7 shows waveforms of the switching signal $S_W$, the feedback signal $V_{FB}$ and the supply voltage $V_{DD}$ of the controller 100 when the power converter enters the normal switching mode from the deep burst switching mode. As the load (represented by "LOAD" in FIG. 7) dramatically changes, for example from level L1 to level L2, the feedback signal $V_{FB}$ will be pulled up. When the feedback signal $V_{FB}$ reaches the start-threshold $V_{S1}$, the switching of the power switch 10 will be resumed. A third time range P3 shows a continuous switching of the switching signal $S_W$ which provides sufficient power in response to heavy load condition. In that time, the power converter has left the deep burst switching mode and enters normal switching mode. During the third time range P3, the feedback signal $V_{FB}$ is pulled up to a regulating value $V_{TGX}$ to guarantee a sufficient supply voltage $V_{DD}$ and the power required by the output loads (the demand of the output current $I_O$ of the power converter). Thanks to the detection circuit 521 in FIG. 5A and FIG. 5B, the power converter can resume its operation by disabling the power-saving signal $S_{PS}$ during the time ranges P1 and P2. This dramatically improves the dynamic response performance of the power converter.

Figure 8:
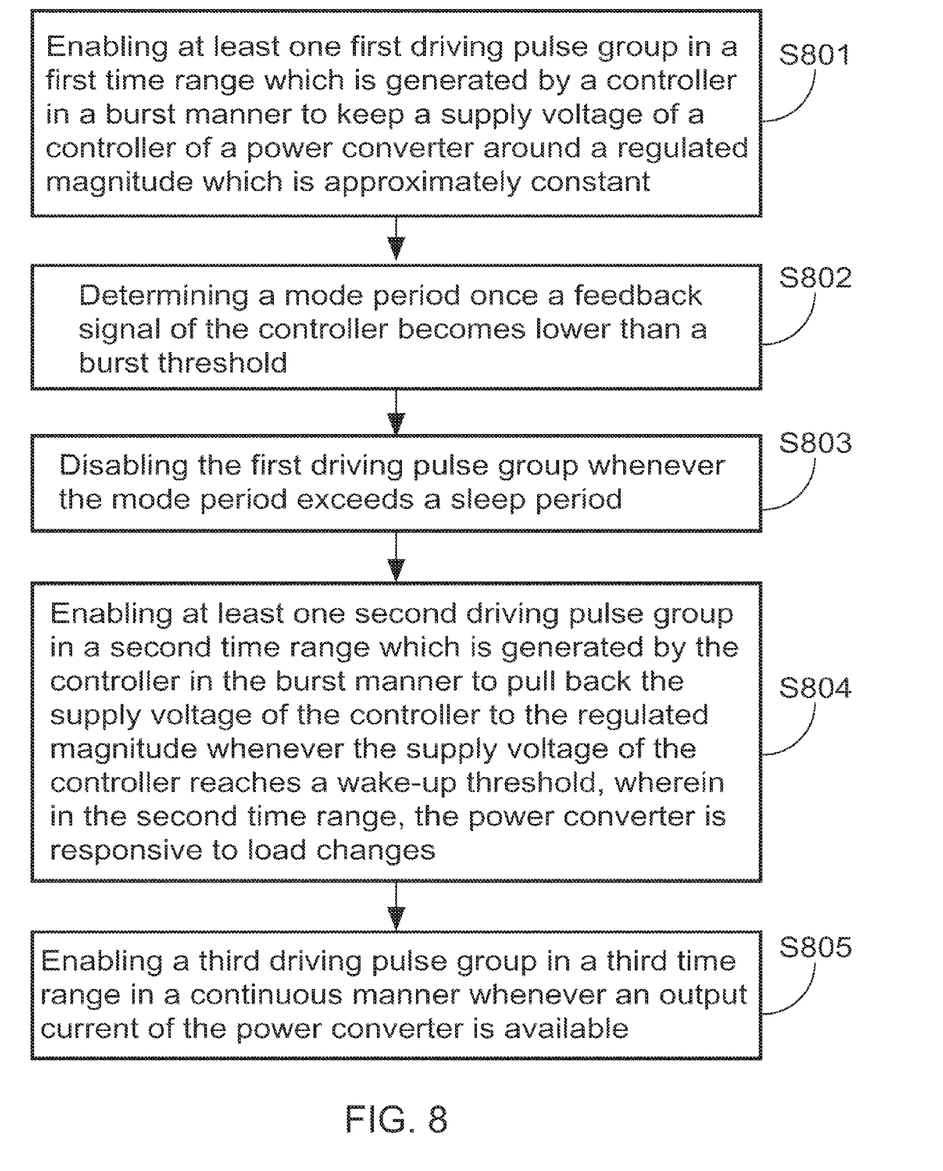
FIG. 8 shows a flowchart depicting a method of power saving for the power converter according to an embodiment of the present invention.

FIG. 8 shows a flowchart depicting a method of power saving for a power converter according to an embodiment of the present invention. The method comprises: enabling at least one first driving pulse group in a first time range which is generated by a controller in a burst manner to keep a supply voltage of a controller of a power converter around a regulated magnitude which is approximately constant (S801); determining a mode period once a feedback signal of the controller becomes lower than a burst threshold (S802); disabling the first driving pulse group whenever the mode period exceeds a sleep period (S803); enabling at least one second driving pulse group in a second time range which is generated by the controller in the burst manner to pull back the supply voltage of the controller to the regulated magnitude whenever the supply voltage of the controller reaches a wake-up threshold, wherein in the second time range, the power converter is responsive to load changes (S804); and enabling a third driving pulse group in a third time range in a continuous manner whenever an output current of the power converter is available (S805).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller with power saving for a power converter, comprising:
   a delay circuit, for determining a delay time;
   a switching signal generation circuit, coupled to generate a switching signal which controls a power switch coupled to a transformer of the power converter for a regulation of said power converter;
   a detection circuit, coupled to said switching signal generation circuit, wherein whenever an output load of said power converter is lower than a light-load threshold, said switching signal is generated in a burst switching manner, and said detection circuit activates said delay circuit; and
   an output circuit, generating a power-saving signal to cease switching of said switching signal after said delay time ends, wherein if said output load increases while said power-saving signal is ceasing said switching of said switching signal, said switching of said switching signal is resumed,
   wherein said switching signal generation circuit is responsive to said output load during which said switching of said switching signal is being ceased.

2. The controller as claimed in claim 1, further comprising a counter circuit coupled to said delay circuit, said counter circuit and said delay circuit determine a sleep period, wherein said output circuit generates said power-saving signal to cease said switching of said switching signal after said sleep period ends.

3. The controller as claimed in claim 1, wherein said output load is detected by detecting a feedback signal correlated to an output of said power converter.

4. The controller as claimed in claim 3, wherein said detection circuit deactivates said power-saving signal whenever said feedback signal becomes higher than a recovery threshold.

5. The controller as claimed in claim 1, wherein said detection circuit deactivates said power-saving signal whenever a number of switching pulses of said switching signal exceeds a determined pulse count.

6. The controller as claimed in claim 1, wherein an output voltage of said power converter and a supply voltage of said controller ramp down whenever said switching of said switching signal is ceased.

7. The controller as claimed in claim 6, further comprising a wake-up circuit coupled to said switching signal generation circuit and said detection circuit to avoid said supply voltage of said controller falling below a shut-down threshold.

8. A method of power saving for a power converter, comprising:
   enabling at least one first driving pulse group in a first time range which is generated by a controller in a burst switching mode to keep a supply voltage of the controller of the power converter around a regulated magnitude which is approximately constant;
   determining a mode period once a feedback signal of said controller is lower than a burst threshold;
   disabling said first driving pulse group whenever said mode period exceeds a sleep period, wherein said supply voltage of the controller starts to ramp down to be lower than a wake-up threshold when the said first driving pulse group is disabled;
   enabling at least one second driving pulse group in a second time range which is generated by said controller in said burst switching mode to pull up said supply voltage of said controller to said regulated magnitude whenever said supply voltage of said controller reaches the wake-up threshold, wherein during which said supply voltage of said controller is ramping down, said power converter is responsive to load changes; and
   enabling a third driving pulse group in a third time range in a continuous manner whenever an output current of said power converter is available.

* * * * *